UNITED STATES PATENT OFFICE.

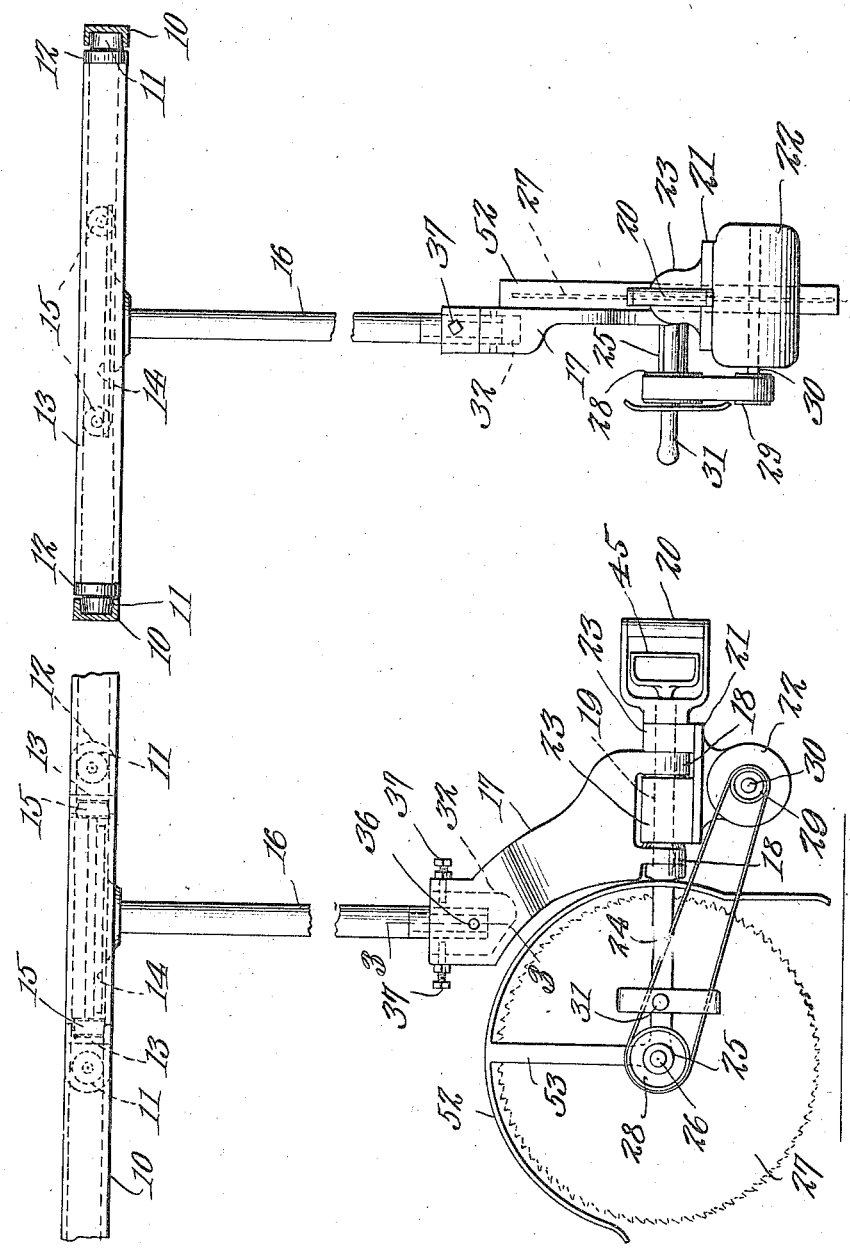

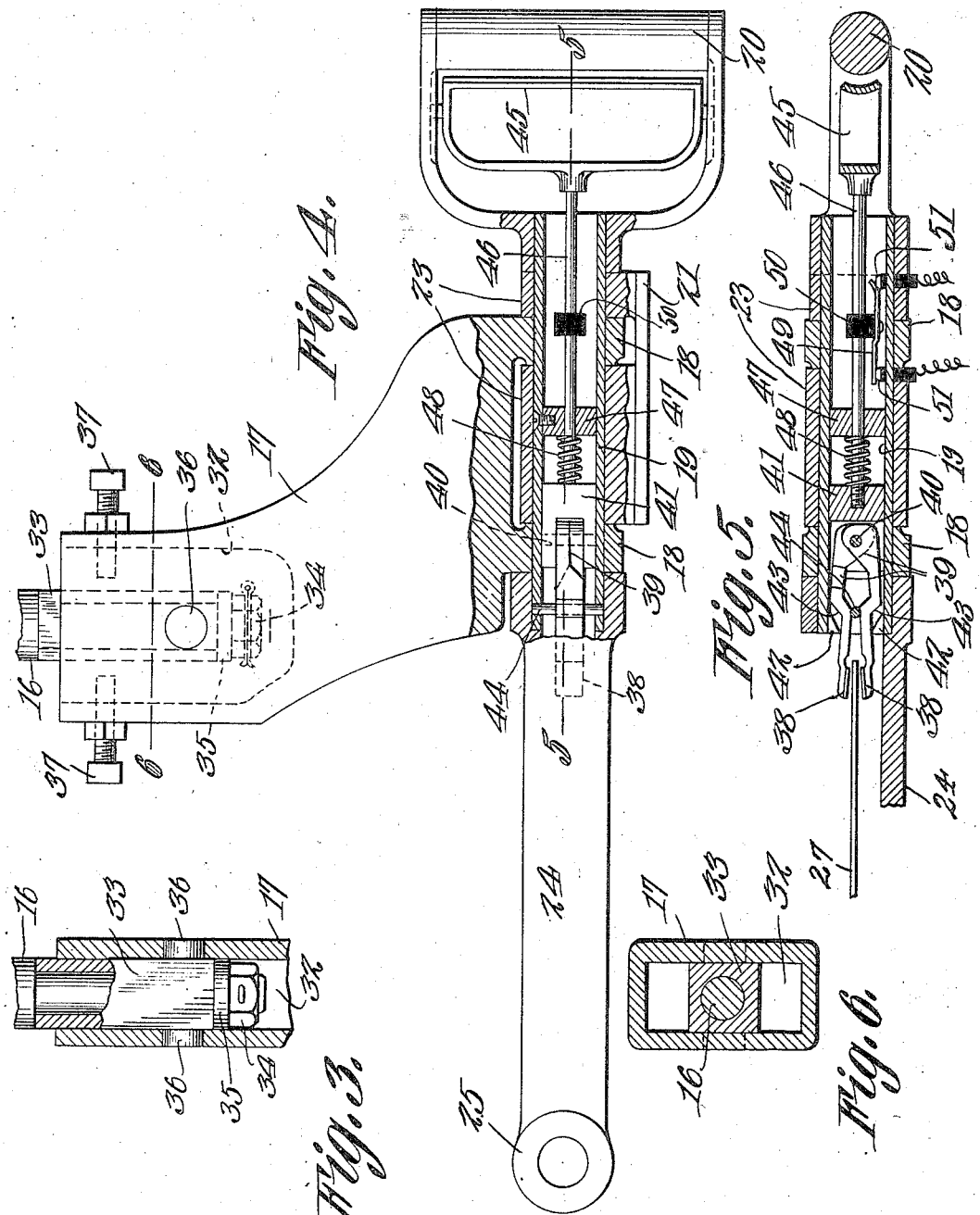
C. E. MICHENER.
SAW.
APPLICATION FILED APR. 21, 1915.
1,189,603.
Patented July 4, 1916.
2 SHEETS—SHEET 2.
Inventor
Charles E. Michener
By Max A. Schmidt
Attorney

CHARLES E. MICHENER, OF CHARLEROI, PENNSYLVANIA.

SAW.

1,189,603. Specification of Letters Patent. Patented July 4, 1916.

Application filed April 21, 1915. Serial No. 22,819.

*To all whom it may concern:*

Be it known that I, CHARLES E. MICHENER, a citizen of the United States, residing at Charleroi, in the county of Washington and State of Pennsylvania, have invented certain new and useful Improvements in Saws of which the following is a specification.

The saw which is the subject-matter of the present application for patent is designed more particularly for meat dealers to reduce the time and labor required in cutting meat, and the invention has for its object to provide a novel and improved power-driven circular saw for this purpose.

The invention also has for its object to provide a novel and improved support for the saw which enables the same to be readily swung in any direction and also raised and lowered at will, so that the saw can be easily applied to a piece of meat lying on the block anywhere, and without moving the meat to the saw.

A further object of the invention is to provide a novel and improved means for controlling the operation of the saw, such means being associated with an operating handle which guides the saw to the work.

The objects stated are attained by means of a combination and arrangement of parts to be hereinafter described and claimed, reference being had to the accompanying drawings in which—

Figure 1 is a side elevation of the apparatus; Fig. 2 is an end view thereof; Fig. 3 is an enlarged section on the line 3—3 of Fig. 1; Fig. 4 is a sectional detail of the saw-controlling devices; Fig. 5 is a section on the line 5—5 of Fig. 4, and Fig. 6 is a horizontal section on the line 6—6 of Fig. 4.

Referring specifically to the drawings, 10 denotes a suitably supported overhead track composed of laterally spaced, parallel channel beams set vertically with the channels facing each other. On this track is mounted a carriage the wheels 11 of which travel on the bottom flanges of the channel beams. The frame of the carriage comprises longitudinal side bars 12 carrying the wheels 11, and connected by spaced, front and rear cross members 13, which latter are channel beams set vertically with their channels facing each other. The channel beams 13 form a track which extends at a right angle to the track formed by the channel beams 10, and supports a sub-carriage 14 mounted on wheels 15 which travel on the bottom flanges of the beams 13.

From the sub-carriage 14 depends a stem 16 which carries a hanger 17 having bearings 18 at the bottom in which is supported a hollow shaft 19 having at one end a hand grip 20. The shaft 19 carries a bracket 21 which supports an electric motor 22, and has bearings 23 at the top through which the shaft passes. The hand grip 20 is to the rear of the bracket 21, and extending outward from the forward end thereof and made fast on the shaft 19, is an arm 24 having at its outer end a bearing 25 in which is journaled the arbor 26 of a circular saw 27. On one end of the saw arbor is a pulley 28 which is belted to a pulley 29 on the shaft 30 of the motor 22. Any other suitable driving connection between the motor and the saw may be provided. The arm 24 has a handle 31 on one side for assisting to guide the saw, said handle having a guard to protect the hand from the drive belt.

The hanger 17 is swiveled to the stem 16, and a connection is also provided which allows the hanger to be swung forward and rearward. This connection is had by the following parts: In the top of the hanger 17 is a recess 32 to receive the lower end of the stem 16, said end being reduced and fitted with a sleeve 33 held on the stem by a bottom nut 34 and washer 35. The sleeve is loose so that it may turn on the stem. From opposite sides of the sleeve extend trunnions 36 which are journaled in the adjacent side walls of the recess 32. These trunnions are horizontal, and the hanger is therefore free to be swung back and forth to the extent of the length of the recess 32. The sleeve 33 is squared externally and the width of the recess is such that the sleeve fits snugly between the opposite side walls thereof in which the trunnions 36 are journaled. The recess is elongated lengthwise sufficiently to allow the hereinbefore described swing- or rocking movement of the hanger, and as the sleeve is loose on the stem 16, the hanger may also be rotated. To limit the swing of the hanger, adjusting screws 37 are threaded therethrough to extend into the recess 32 in front of and to the rear of the sleeve 33.

A brake is provided for the saw 27, said brake comprising two opposite jaw members 38 between which the saw is located. The shanks 39 of the jaw members are lapped and pivotally connected, as indicated at 40, to a block 41 slidably mounted in the shaft 19. The shanks 39 are partly housed in the shaft 19 and at the outer end thereof, said shaft has, on the inside thereof, diametrically opposite inclines 42 located opposite corresponding inclines 43 on the shanks 39, and inside the shaft is a transverse pin 44 located midway between the shanks. The brake is applied by advancing the block 41, whereupon the inclines 42 and 43 meet and force the jaws 38 together to grip the saw. Upon retracting the block, the pin 44 comes between the jaws and spreads the same to release the saw. The block 41 is operated by a hand grip 45 connected by a rod or shank 46 to said block. Inside the shaft 19 is a fixed abutment 47, between which latter and the block 41 is interposed a spring 48, the same being coiled around the rod 46. This spring serves to hold the block 41 normally advanced to apply the brake, and the latter is released as hereinbefore described by pulling the hand grip 45 rearward. The hand grip 45 is located inside the hand grip 20, so that when the latter is grasped to operate the saw, the former is drawn back to release the brake, and when the hand grip 20 is released, after the cut has been made, the hand grip 45 is released at the same time and the brake is automatically applied by the spring 48.

The hand grip 45 also controls the motor 22 through the following devices: The rod 46 carries a switch tongue 49, the same being fastened to the rod by a collar 50 of insulation. In the shaft 19 are two contacts 51 to which the current wires of the motor are connected. The switch tongue 49 is so located that it is normally free of one of the contacts 51, and when the hand grip 45 is grasped to release the brake, the rearward movement of the rod 46 brings the switch tongue against said contact to make a connection with the opposite contact, thus closing the motor circuit.

It will be evident from the foregoing that the saw can be very easily controlled, the same hand which grasps the hand grip 20 also operating the hand grip 45 which controls the brake and the motor circuit, and when the hand grip 20 is released, the brake is automatically applied and at the same time the motor circuit is broken.

The overhead traveling support having the longitudinal and lateral movement as hereinbefore described, together with the swiveling and rocking support of the hanger 17, enables the saw to be readily swung in any direction and also raised and lowered, and the saw can therefore be carried to any part of the block and the meat can be cut without moving it to the saw. The shaft 19 is loose in the bearings 18, and as the parts 21 and 24 are fast on said shaft, it will be evident that upon rocking the shaft, the saw may be tilted sidewise. The saw 27 has a guard 52 carried by an arm 53 rising from the bearing 25. The saw can be used on as many blocks as desired, by extending the longitudinal overhead track over the different blocks.

The preferred embodiment of the invention has been shown, but it will be evident that various changes and modifications may be made without a departure therefrom as claimed hereinafter.

I claim:

1. In a hand-controlled, power-operated saw, the combination of a support, a stem depending from the support, a sleeve swiveled on the lower end of the stem and carrying trunnions, a hanger having a top recess to receive the lower end of the stem and the sleeve thereon, the side walls of the recess having bearings in which the trunnions are journaled, a motor support carried by the hanger, and a saw support on the motor support.

2. In a hand-controlled, power-operated saw, the combination of a hollow shaft, a motor supporting bracket carried by the shaft, a hand grip on the shaft, a saw-supporting arm fast on the shaft, a slidable rod housed in the shaft, a hand grip on said rod located in proximity to the aforesaid hand grip, motor-controlling means carried by the rod, and a saw-brake operatively connected to the rod.

3. In a hand-controlled, power-operated saw, the combination of a hanger, a shaft rockably supported by the hanger, a motor supporting bracket fast on the shaft, a hand-grip fast on one end of the shaft, and a saw-supporting arm fast on the other end of the shaft.

4. In a hand-controlled, power-operated saw, the combination of a support having bearings, a shaft journaled in said bearings and projecting therefrom at its ends, a motor support carried by the shaft intermediate its ends and fast thereon, a saw-supporting arm fast on one end of the shaft, the axis of the saw extending transversely of the axis of the shaft, and a controlling hand grip on the other end of the shaft.

In testimony whereof I affix my signature in presence of two witnesses.

CHARLES E. MICHENER.

Witnesses:
 JAMES ENIX,
 JAMES GELDER.